(12) United States Patent
Salazar

(10) Patent No.: US 7,994,906 B2
(45) Date of Patent: Aug. 9, 2011

(54) PRESSURE-RESPONSIVE VEHICLE ALARM PAD

(76) Inventor: Kelly Salazar, Gardnerville, NV (US)

(*) Notice: Subject to any disclaimer, the term of this patent is extended or adjusted under 35 U.S.C. 154(b) by 450 days.

(21) Appl. No.: 12/038,265

(22) Filed: Feb. 27, 2008

(65) Prior Publication Data

US 2009/0212933 A1    Aug. 27, 2009

(51) Int. Cl.
*B60Q 1/00* (2006.01)
(52) U.S. Cl. ............... 340/457; 340/438; 340/425.5; 340/460; 180/271; 180/272; 180/274; 701/33; 701/36; 701/45; 701/46
(58) Field of Classification Search ............... 340/457, 340/438, 459, 460, 464, 425.5, 500, 901, 340/286.01; 116/28; 297/253; 73/862.046; 200/85 A; 701/36, 45, 46, 33; 180/271–274
See application file for complete search history.

(56) References Cited

U.S. PATENT DOCUMENTS

| | | | | |
|---|---|---|---|---|
| 6,366,200 B1 * | 4/2002 | Aoki | ............................ | 340/438 |
| 7,457,695 B1 * | 11/2008 | Fields et al. | ..................... | 701/36 |
| 2002/0161501 A1 * | 10/2002 | Dulin et al. | ..................... | 701/45 |
| 2003/0062996 A1 * | 4/2003 | Flanagan et al. | .............. | 340/457 |
| 2003/0173195 A1 * | 9/2003 | Federspiel | ................... | 200/85 A |
| 2004/0069075 A1 * | 4/2004 | Jakoby et al. | ............ | 73/862.046 |
| 2005/0030188 A1 * | 2/2005 | Flanagan et al. | .............. | 340/667 |
| 2005/0072249 A1 * | 4/2005 | Maeda et al. | ............ | 73/862.046 |
| 2009/0160232 A1 * | 6/2009 | Hinze et al. | ................... | 297/253 |

* cited by examiner

*Primary Examiner* — George A Bugg
*Assistant Examiner* — Sisay Yacob
(74) *Attorney, Agent, or Firm* — Michael Ries

(57) ABSTRACT

Disclosed is a pressure-responsive vehicle alarm pad for a vehicle seat to remind a presence of an object inside a vehicle to an occupant of the vehicle seat. The pressure-responsive vehicle alarm pad comprises a pressure sensor pad, a control circuitry, and alarm speakers. The pressure sensor pad disposed on the vehicle seat to detect a pressure of the occupant. The control circuitry electrically coupled to the pressure sensor pad to receive the detected pressure from the pressure sensor pad. The control circuitry generate a first electrical signal when the detected pressure is greater than a threshold pressure, and generates a second electrical signal when the detected pressure is less than the threshold pressure. The alarm speakers electrically coupled to the control circuitry to generate a first audible sound in response to the first electrical signal, and generate a second audible sound in response to the second electrical signal.

9 Claims, 3 Drawing Sheets

PRESSURE-RESPONSIVE VEHICLE ALARM PAD

FIELD OF THE INVENTION

The present invention relates to vehicle alarms, and more particularly to a vehicle alarm pad secured on a vehicle seat for reminding a presence of an object, such as a child and a pet, inside a vehicle.

BACKGROUND OF THE INVENTION

Infants are unable to take care of themselves, and as such, the infants are always on the forefront of people's minds to take extra care and ensure the infant's safety. Even though keeping the infant's safety is on the forefront, there is the possibility that the infants may sometimes be forgotten. Particularly, in vehicles, people while involved in driving may forget a presence of the infants inside the vehicle and move outside from the vehicle to follow their chores. Statistics from police and fire departments show that each year numerous emergency calls are received as a result of the infants left unattended in the vehicles, which incidents often result in serious injury or death to the infants in the vehicles.

For the vehicles, various infant safety devices, particularly alarm devices, have been introduced from time to time to indicate the presence of the infants inside the vehicle. These alarm devices may be permanently secured in the vehicle on an infant seat as a part of the infant seat. However, these alarm devices only release audible sounds when the vehicle's ignition is on. Apart from this, such alarm devices may cause inconvenience to an infant, as the alarm devices are secured on the infant seat. Further, there are other alarm devices available, which involve dual alarm systems. In these alarm devices, one alarm may be permanently secured to a driver seat and another alarm may be permanently secured to the infant seat. However, these alarm devices are bulky due to complex circuitry and two alarms placed at two different places such as the driver seat and the infant seat.

Accordingly, there is need for an alarm device which may not be permanently attached to the driver seat. Further, the alarm device should be capable of releasing audible sound even when the vehicle's ignition is off. Furthermore, the alarm device should have a compact design including fewer external parts.

SUMMARY OF THE INVENTION

An object of the present invention is to provide an alarm device such as a pressure-responsive vehicle alarm pad that is capable of being detachably attached to a vehicle seat. Further, the pressure-responsive vehicle alarm pad is capable of releasing audible sounds based on a pressure of an occupant of the vehicle seat, and further by release of the pressure of the occupant from the vehicle seat.

Another object of the present invention is to provide a pressure-responsive vehicle alarm pad that is capable of releasing audible sounds irrespective of whether the vehicle's ignition is on or off.

Another object of the present invention is to provide a pressure-responsive vehicle alarm pad, which has a compact design.

Another object of the present invention is to provide a pressure-responsive vehicle alarm pad capable of facilitating a comfortable seating to the occupant on the vehicle seat and protecting the pressure-responsive vehicle alarm pad from moisture or water drops.

Another object of the present invention is to provide a pressure-responsive vehicle alarm pad capable of facilitating the occupant to conveniently reset the pressure-responsive vehicle alarm pad.

Still another object of the present invention is to provide a pressure-responsive vehicle alarm pad capable of facilitating the occupant to record variable sounds.

In view of the foregoing disadvantages inherent in the prior art, the general purpose of the present invention is to provide a pressure-responsive vehicle alarm pad that is configured to include all advantages of the prior art, and to overcome the drawbacks inherent therein.

In an aspect, the present invention provides a pressure-responsive vehicle alarm pad, which is capable of being secured on a vehicle seat of a vehicle. The pressure-responsive vehicle alarm pad is capable of reminding a presence of an object inside the vehicle to an occupant of the vehicle seat. The pressure-responsive vehicle alarm pad includes a pressure sensor pad, a control circuitry and an alarm speaker. The pressure sensor pad may be disposed on the vehicle seat for detecting a pressure of the occupant. The control circuitry is electrically coupled to the pressure sensor pad and receives the detected pressure from the pressure sensor pad. The control circuitry generates a first electrical signal, when the detected pressure is greater than a threshold pressure, and generates a second electrical signal, when the detected pressure is less than the threshold pressure. The alarm speaker is electrically coupled to the control circuitry. The alarm speaker generate a first audible sound in response to the first electrical signal, and generate a second audible sound in response to the second electrical signal to remind the presence of the object inside the vehicle to the occupant.

These together with the other aspects of the present invention, along with the various feature of novelty that characterize the present invention, are pointed out with particularity in the claims annexed hereto and form a part of the present invention. For a better understanding of the present invention, its operating advantages, and the specified object attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE INVENTION

For a thorough understanding of the present invention, reference is to be made to the following detailed description, including the appended claims, in connection with the above-described drawings. Although the present invention is described in connection with exemplary embodiments, the present invention is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting.

The terms "a" and "an" herein do not denote a limitation of quantity, but rather denote the presence of at least one of the referenced item. The terms "first," "second," and the like, herein do not denote any order, quantity, or importance, but rather are used to distinguish one element from another.

The present invention provides a pressure-responsive vehicle alarm pad to remind an occupant of a vehicle seat about a presence of an object inside a vehicle. The occupant of the vehicle seat may be a driver or any passenger and the object may include an infant or a pet. The pressure-responsive vehicle alarm pad may be secured on the vehicle seat inside the vehicle. The pressure-responsive vehicle alarm pad is configured to release an output audible sound to remind the occupant about the object, when the occupant sits on the vehicle seat. Further, when the occupant gets up from the vehicle seat in order to leave the vehicle, the pressure-responsive vehicle alarm pad releases another audible sound to remind the occupant again about the object, so that the occupant may act accordingly.

Figures 1A, 1B:
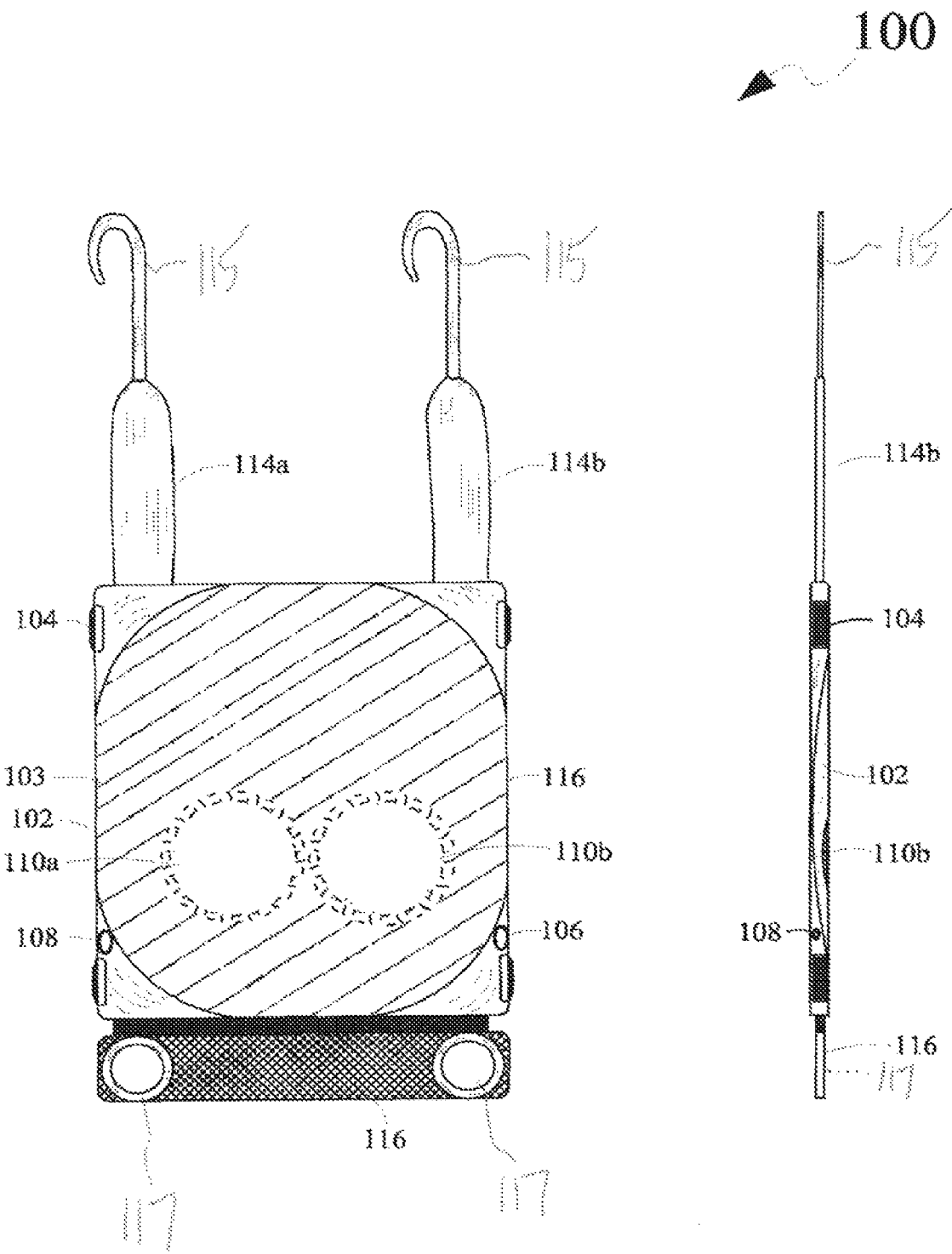
FIG. 1A illustrate a front view of a pressure-responsive vehicle alarm pad, according to an exemplary embodiment of the present invention.
FIG. 1B illustrate a side view of the pressure-responsive vehicle alarm pad of FIG. 1.

Referring to FIGS. 1A and 1B, the pressure-responsive vehicle alarm pad such as a pressure-responsive vehicle alarm pad 100 (hereinafter referred to as 'vehicle alarm pad 100'), is shown. FIG. 1A represents a front view of the vehicle alarm pad 100, according to an exemplary embodiment of the present invention. Further, FIG. 1B represents a side view of the vehicle alarm pad 100 of FIG. 1A.

The vehicle alarm pad 100 includes a pressure sensor pad 102, a control circuitry (not shown in FIGS. 1A and 1B), an alarm speaker 104, a sound record switch 106 and a reset switch 108. The vehicle alarm pad 100 is capable of being placed on a vehicle seat (not shown in FIGS. 1A and 1B), preferably on a driver seat, of the vehicle. The arrangement of the vehicle alarm pad 100 in the vehicle is described in conjunction with FIG. 2. Herein, the pressure sensor pad 102 includes a cover 103, which wraps a pressure sensor 110a and a pressure sensor 110b. In an embodiment of the present invention, the pressure sensors 110a and 110b are disposed adjacent to each other within the cover 103 as shown in FIG. 1A. Further, in this embodiment of the present invention, the cover 103 may be stitched around the pressure sensors 110a and 110b in order to secure the pressure sensors 110a and 110b within the cover 103. Ordinarily, stitching of the cover 103 around the pressure sensors 110a and 110b makes the pressure sensors 110a and 110b to be visible to the occupant who sits on the vehicle seat. Accordingly, the occupant may sit on the pressure sensor pad 102 for an effective working of the vehicle alarm pad 100.

In another embodiment of the present invention, the pressure sensors 110a and 110b may be coupled to the cover 103 by suitable adhesive means such as glue. In FIG. 1A, an exemplary representation of the pressure sensor pad 102 is shown, which includes only two pressure sensors 110a and 110b. However, it will be obvious to a person skilled in the art to dispose more or less than two pressure sensors similar to the pressure sensor pad 102, within the cover 103. The pressure sensors 110a and 110b of the pressure sensor pad 102 may be either a capacitive pressure sensor or an elastomer pressure sensor. The pressure sensors 110a and 110b of the pressure sensor pad 102 is electrically coupled to the control circuitry. The configuration of the control circuitry is further described in conjunction with FIG. 3. The vehicle alarm pad 100 further includes a battery (not shown) to power the control circuitry and the alarm speaker 104.

The control circuitry may be electrically coupled to the pressure sensors 110a and 110b in such a manner that the control circuitry is also wrapped in the cover 103, which makes a compact design of the vehicle alarm pad 100. The pressure sensor pad 102 detects a pressure exerted by the occupant on the pressure sensors 110a and 110b. The control circuitry is configured to receive the detected pressure from the pressure sensor pad 102. Accordingly, the control circuitry generates electrical signals based on the detected pressure. For example, the control circuitry generates a first electrical signal, when the detected pressure is greater than a threshold pressure. The control circuitry further generates a second electrical signal when the detected pressure is less than the threshold pressure. In one embodiment of the present invention, the threshold pressure is 10 lb. However, the threshold pressure may be selected according to weight of the occupant or the personal preferences of the occupant. The control circuitry is further electrically coupled to the alarm speaker 104. The alarm speaker 104 is configured to generate audible sounds in response to the electrical signals received from the control circuitry. For example, a first audible sound is generated in response to the first electrical signal and a second audible sound is generated in response to the second electrical signal.

In one embodiment of the present invention, the alarm speaker 104 may be disposed at four corners of the pressure sensor pad 102, as shown in FIG. 1A. However, the arrangement of the alarm speaker 104 as shown in FIG. 1, is for the exemplary purposes only and should not be considered limiting. Further, numbers of the alarm speaker 104 represented in the vehicle alarm pad 100 are four, is only for the exemplary purposes. Hence, the alarm speaker 104 is not limited to as shown in figures or described herein. Accordingly, the alarm speaker 104 may be substantially smaller in size and may be more or less in numbers than four. Further, the alarm speaker 104 may also be placed within the pressure sensor pad 102, thereby forming an integral part of the pressure sensor pad 102.

Figure 2:
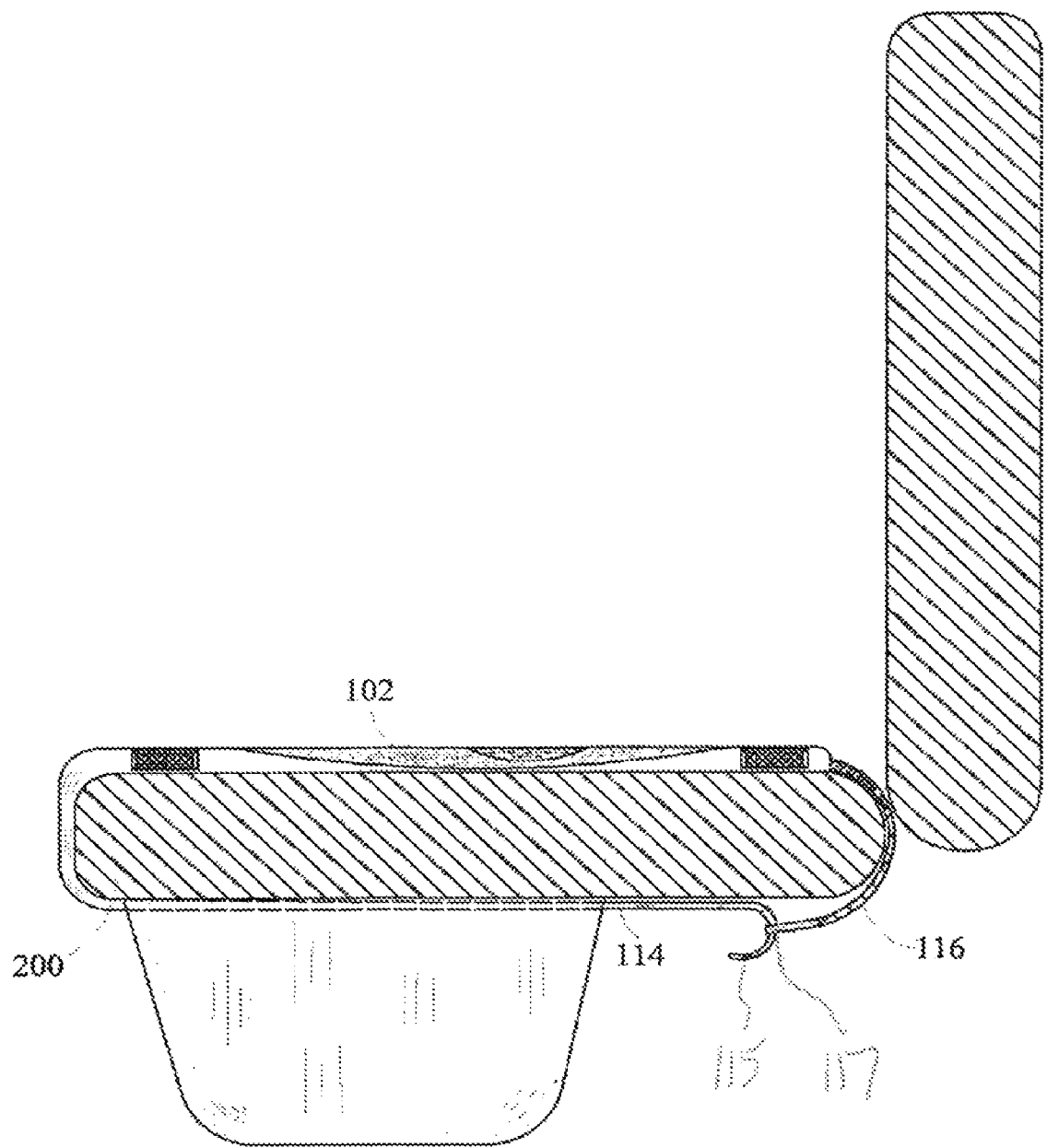
FIG. 2 illustrate a perspective view of the pressure-responsive vehicle alarm pad of FIG. 1, secured on a vehicle seat, according to an exemplary embodiment of the present invention.

The working of the vehicle alarm pad 100 to detect the presence of the object may be explained with reference to FIG. 2. As shown in FIG. 2, the vehicle alarm pad 100 is placed on the vehicle seat such as a vehicle seat 200. The vehicle alarm pad 100 includes at least one hook strap such as a hook strap 114a and a hook strap 114b (hereinafter collectively referred to as hook straps 114) and a roll strap 116 to secure the pressure sensor pad 102 around the vehicle seat 200. The hook straps 114 and the roll strap 116 are attached on opposite sides of the pressure sensor pad 102. Accordingly, the hook straps 114 may be engaged to the roll strap 116 with a pair of apertures 117 disposed on the roll strap 116 to secure the vehicle alarm pad 100 around the vehicle seat 200. The hook straps 114 have a hook 115 disposed on a distal end of each hook strap 114. The hook straps 114 are wrapped around the entire vehicle seat 200 and the hooks 115 are removably inserted into the pair of apertures 117, securing the vehicle alarm pad 100 to the vehicle seat, although any suitable number of apertures 117 or hook straps 114 can be utilized to secure the vehicle alarm pad 100 to the vehicle seat 200. The vehicle seat 200 can be a bottom seat or a vertical seat of the vehicle. The alarm speaker 104 releases first audible sound, when the occupant of the vehicle seat occupies the vehicle seat 200. The alarm speaker 104 releases second audible sound, when the occupant vacates the vehicle seat 200.

The first audible sound and the second audible sound may be chosen, such that they remind the occupant about the object in the vehicle. For example first audible sound and the second audible sound may be, "see me" and "remember me", respectively. The first audible sound, such as "see me" may be released by the alarm speaker 104, when the occupant sits at the pressure sensor pad 102 of the vehicle alarm pad 100, which is placed on the vehicle seat 200. On listening to the first audible sound, such as "see me", the occupant may turn around to check the presence of the object in the vehicle. The second audible sound, such as "remember me" may be released by the alarm speaker 104 when the occupant vacates the pressure sensor pad 102 of the vehicle alarm pad 100 placed on the vehicle seat 200. On listening to the second audible sound, such as "remember me", the occupant may turn around to remember the presence of the object in the vehicle. It will be apparent to a person skilled in the art that other suitable audible sounds, such as siren sound or a crying baby sound may also be used for the aforesaid purpose.

The first audible sound such as "see me" and the second audible sound such as "remember me" may be recorded by the sound record switch 106 that is electrically coupled to the control circuitry within the pressure sensor pad 102. The occupant may record his own sound as the first audible sound and the second audible sound by pressing the sound record switch 106. Further, the occupant may reset the vehicle alarm pad 100 after listening to the first audible sound, such as "see me" and the second audible sound such as "remember me" once or twice, by pressing the reset switch 108. The reset switch 108 is electrically coupled to the control circuitry within the pressure sensor pad 102. More specifically, the reset switch 108 is configured to reset the first electrical signal that generates the first audible sound, and to reset the second electrical signal that generates the second audible sound.

Figure 3:
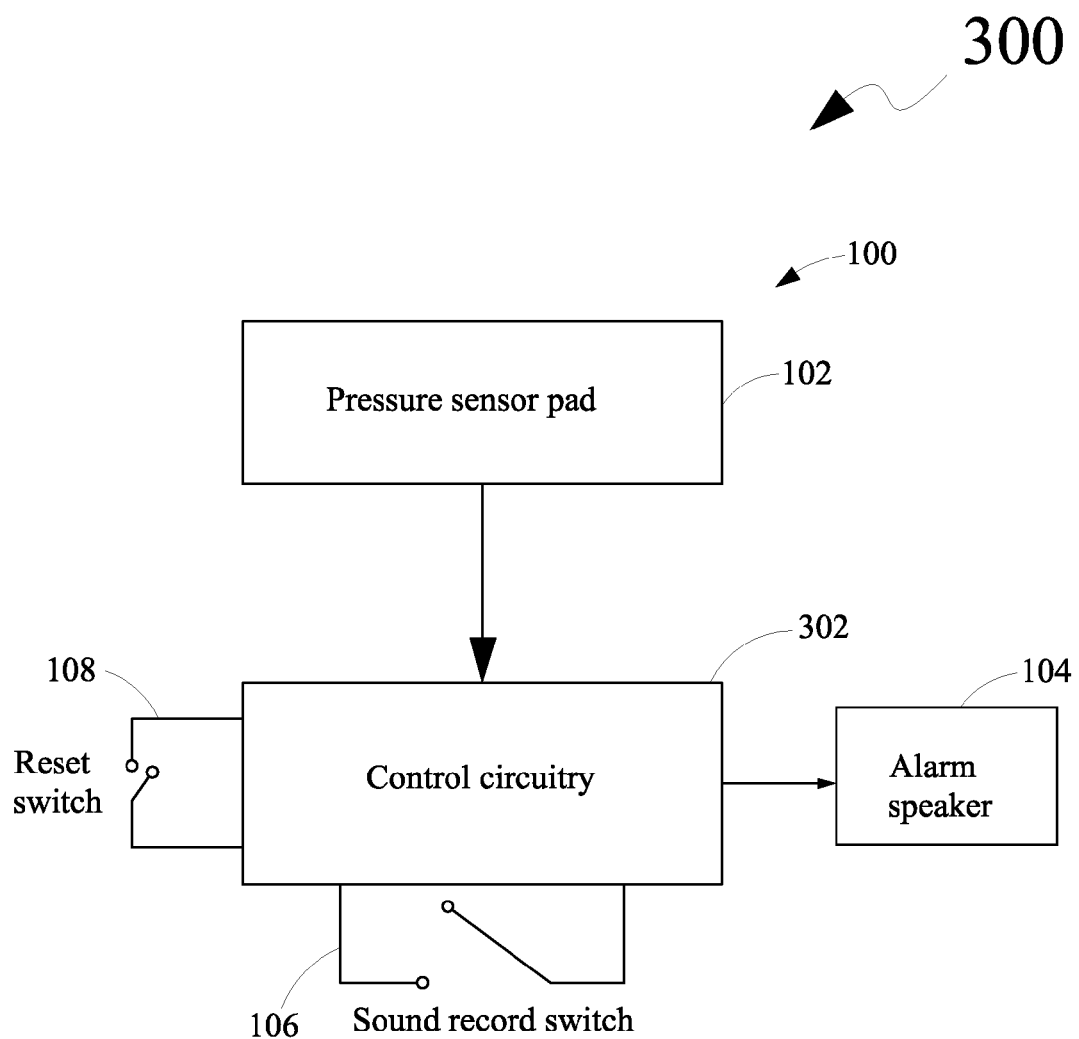
FIG. 3 is a wiring diagram view of the pressure-responsive vehicle alarm pad of FIG. 1, according to an exemplary embodiment of the present invention.

Referring now to FIG. 3, a wiring diagram view 300 of the vehicle alarm pad 100 of FIG. 1 is illustrated. The pressure sensor pad 102 detects the pressure of the occupant. The control circuitry such as a control circuitry 302 is coupled to the pressure sensor pad 102 and accordingly receives a pressure signal from the pressure sensor pad 102. The control circuitry 302 processes the pressure signal and releases one of the first electrical signal and the second electrical signal. When the occupant sits on the vehicle seat, the pressure of the occupant is detected by the pressure sensor pad 102. Further, the control circuitry 302 receives the detected pressure of the occupant and is configured to release the first electrical signal, when the detected pressure is greater than the threshold pressure. As shown in FIG. 3, the alarm speaker 104 is electrically coupled to the control circuitry 302. The first electrical signal is communicated to the alarm speaker 104 and accordingly the alarm speaker 104 releases the first audible sound, such as "see me" to drive attention of the occupant towards the object in the vehicle. The occupant, after hearing the first audible sound may act accordingly, to the object in the vehicle.

Further, when the occupant gets up from the vehicle seat in order to leave the vehicle, ordinarily, the pressure of the occupant detected by the pressure sensor pad 102 is zero, which is less than the threshold pressure. Accordingly, the control circuitry 302 releases the second electrical signal. Thereafter, the alarm speaker 104 releases the second audible sound such as "remember me". The occupant after hearing the second audible sound may act accordingly, to remember the presence of the object in the vehicle. Once the occupant hears the first audible sound or the second audible sound, the occupant may reset these audible sounds by pressing the reset switch 108, which is electrically coupled to the control circuitry 302. More specifically, upon pressing the reset switch 108, the first electrical signals and the second electrical signals become reset, which in turn reset the first audible sound and the second audible sound, respectively. Similarly, for recording a sound for the first audible sound or the second audible sound, the sound record switch 106 is electrically coupled to the control circuitry 302 within the pressure sensor pad 102.

Further, referring again to FIG. 2, the cover 103 of the pressure sensor pad 102 may be made of suitable soft materials. Examples of the suitable soft materials include, but are not limited to, denim, foam and corduroy. In an embodiment of the present invention, the pressure sensor pad 102 may be covered with a water resistance sheet (not shown) to avoid the effect of moisture or water drops to the vehicle alarm pad 100. Examples of the water resistant material include, but are not limited to, nylon and plastic.

Various embodiments of the present invention offer following advantages. The present invention provides a pressure-responsive vehicle alarm pad, such as, the vehicle alarm pad 100, which operates independent of whether the vehicle's ignition is on or off. Further, the pressure-responsive vehicle alarm pad facilitates the occupant to record various sounds according to occupant's preferences, and may be conveniently reset by the occupant. Furthermore, the pressure-responsive vehicle alarm pad is compact in design, as various components such as the pressure sensors 110a and 110b, the reset switch 108, the alarm speaker 104 and the control circuitry 302 may be wrapped in the cover 103. Moreover, the pressure-responsive vehicle alarm pad facilitates a comfortable seating to the occupant on the vehicle seat, and the pressure-responsive vehicle alarm pad may be protected by the moisture or the water drops by using a water resistant sheet above the cover 103.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enable others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present invention.

What is claimed is:

1. A pressure-responsive vehicle alarm pad to remind a presence of an object inside a vehicle to an occupant of a vehicle seat, the pressure-responsive vehicle alarm pad comprising:
 a pressure sensor pad disposed on the vehicle seat for detecting a pressure generated by the object;
 a control circuitry electrically coupled to the pressure sensor pad, the control circuitry configured to generate a first electrical signal when the detected pressure is greater than a threshold pressure, and
 generate a second electrical signal when the detected pressure is less than the threshold pressure;

an alarm speaker electrically coupled to the control circuitry, the alarm speaker configured to generate a first audible sound in response to the first electrical signal, and generate a second audible sound in response to the second electrical signal to remind the presence of the object inside the vehicle to the occupant; and one or more hook straps with a hook disposed on a distal end of each hook strap and one or more roll straps with a pair of apertures disposed on the roll strap, the hook straps and the roll straps are attached on opposite sides of the pressure sensor pad, the hook straps are wrapped around the entire vehicle seat and the hooks are removably inserted into the pair of apertures, securing the vehicle alarm pad to the vehicle seat.

2. The pressure-responsive vehicle alarm pad of claim 1, further comprising a reset switch electrically coupled to the control circuitry, the reset switch configured to reset the first electrical signal and the second electrical signal.

3. The pressure-responsive vehicle alarm pad of claim 1, further comprising a sound record switch electrically coupled to the control circuitry for recording the first audible sound and the second audible sound.

4. The pressure-responsive vehicle alarm pad of claim 1, further comprising a battery for supplying power to at least one of the control circuitry and the alarm speaker.

5. The pressure-responsive vehicle alarm pad of claim 1, wherein the pressure sensor pad is a capacitive pressure sensor.

6. The pressure-responsive vehicle alarm pad of claim 1, wherein the pressure sensor pad is an elastomer pressure sensor.

7. The pressure-responsive vehicle alarm pad of claim 1, further comprising a water resistant sheet disposed on the pressure sensor pad.

8. The pressure-responsive vehicle alarm pad of claim 1, wherein the object is a child in a car seat.

9. The pressure-responsive vehicle alarm pad of claim 1, wherein the object is a pet.

* * * * *